US005492346A

United States Patent [19]
Stadler et al.

[11] Patent Number: 5,492,346
[45] Date of Patent: Feb. 20, 1996

[54] SCUBA TOTE

[75] Inventors: Linda Stadler; Lenard D. Smith, both of San Ramon, Calif.

[73] Assignee: 21 Fathoms, San Ramon, Calif.

[21] Appl. No.: 125,490

[22] Filed: Sep. 21, 1993

[51] Int. Cl.$^6$ ....................................................... B62B 1/14
[52] U.S. Cl. ................................ 280/47.19; 280/47.26; 280/47.315; 280/47.33; 280/79.6
[58] Field of Search ...................... 280/47.19, 47.26, 280/47.28, 47.315, 47.33, 47.35, 79.2, 79.6, 655, 655.1; 206/372, 373, 471; 211/60.1; 220/675, 913, DIG. 12

[56] References Cited

U.S. PATENT DOCUMENTS

| | | | |
|---|---|---|---|
| D. 189,814 | 2/1961 | Smith | 280/47.35 X |
| D. 319,003 | 8/1991 | Scharrenberg, Jr. | |
| 1,244,030 | 10/1917 | Cave | 280/47.26 X |
| 1,868,912 | 7/1932 | Plank | |
| 3,064,991 | 11/1962 | Huthsing, Jr. | 280/47.33 X |
| 3,499,540 | 3/1970 | Huncovsky | 211/60.1 |
| 3,581,929 | 6/1971 | Guenard et al. | 211/60.1 X |
| 3,637,236 | 1/1972 | Shimoji et al. | |
| 4,253,716 | 3/1981 | Turner, Jr. | 206/373 X |
| 4,316,305 | 2/1982 | Seaford | |
| 4,550,931 | 11/1985 | Ziaylek, Jr. | 280/655 |
| 4,592,585 | 6/1986 | Oren et al. | |
| 4,597,503 | 7/1986 | Lates | |
| 4,712,657 | 12/1987 | Myers et al. | 220/675 X |
| 4,832,398 | 5/1989 | Tecca et al. | |
| 4,986,596 | 1/1991 | Gohier | |
| 5,011,013 | 4/1991 | Meisner et al. | 206/373 |
| 5,040,808 | 8/1991 | McIntyre | |
| 5,040,811 | 8/1991 | Busken et al. | |
| 5,048,649 | 9/1991 | Carpenter et al. | |
| 5,131,670 | 7/1992 | Clements et al. | |

FOREIGN PATENT DOCUMENTS

| | | | |
|---|---|---|---|
| 2685621 | 7/1993 | France | 211/60.1 |
| 0037071 | 2/1990 | Japan | 280/79.6 |
| 5-139316 | 6/1993 | Japan | 280/79.6 |
| 1751024 | 7/1992 | U.S.S.R. | 280/47.26 |
| 9322176 | 11/1993 | WIPO | 280/79.2 |

OTHER PUBLICATIONS

"Performance™ diver—America's Largest Dive Catalog", Winter '93, Chapel Hill, N.C., p. 22.

Primary Examiner—Brian L. Johnson
Attorney, Agent, or Firm—Merchant, Gould, Smith, Edell, Welter & Schmidt

[57] ABSTRACT

A scuba tote provides a wheeled based and a cover having form-fitted recesses on its outer surface for storing scuba tanks. The recesses include shelves for maintaining the position of the scuba tanks on the cover as the scuba tote is moved from one location to another. Straps are also employed to maintain the position of the scuba tanks within the recesses during transportation. An airtight seal is employed to maintain atmospheric pressure within the body of the scuba tote. A locking mechanism restricts entry into the scuba tote. Wide wheels are used so that the scuba tote can readily traverse sand or other soft surfaces. A retractable handle is used to pull or push the scuba tote.

18 Claims, 6 Drawing Sheets

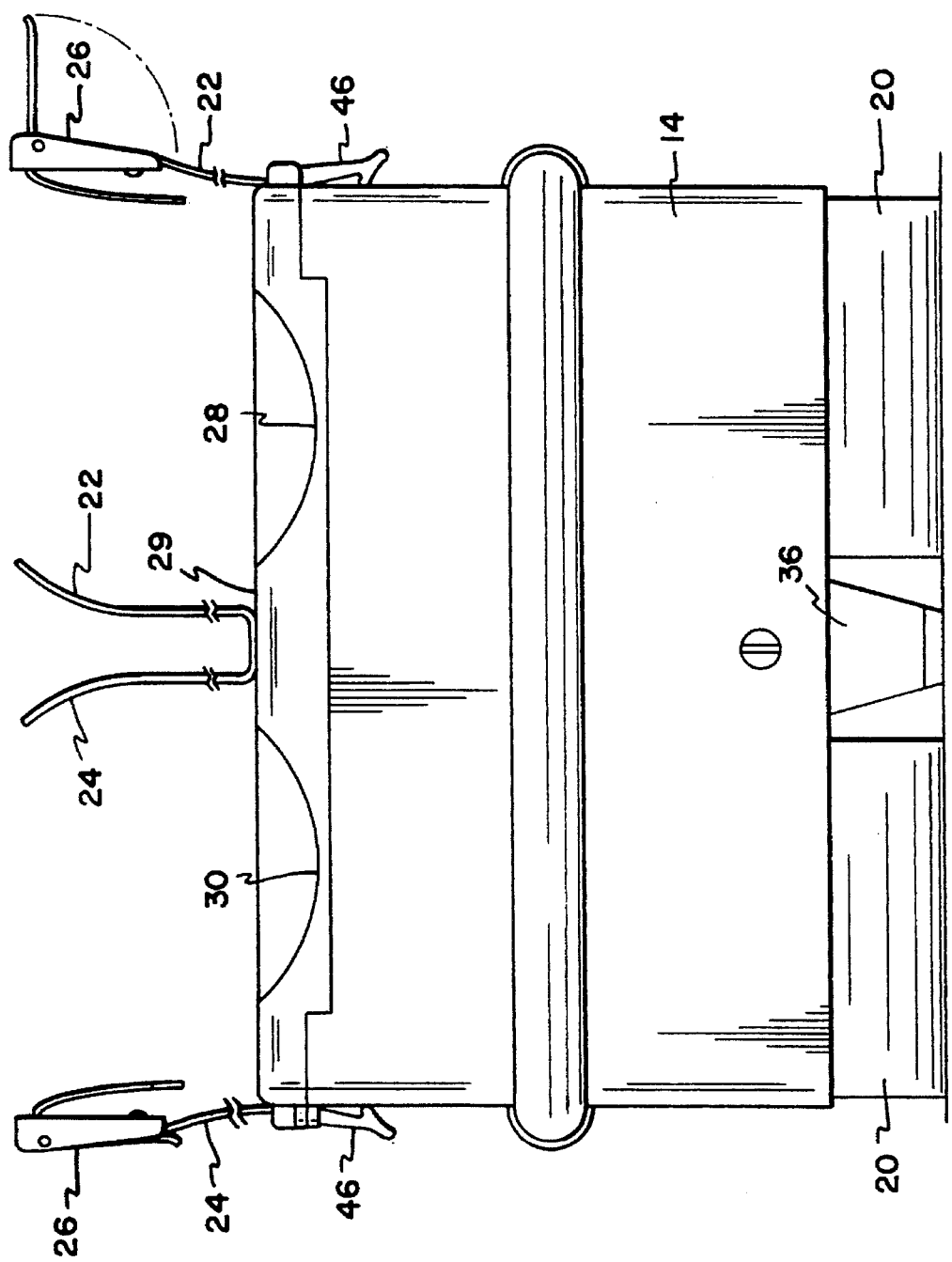

SCUBA TOTE

BACKGROUND OF THE INVENTION

1. Field of the Invention

This invention relates in general to pull-carts, and in particular, to a pull-cart specially adapted for transporting scuba tanks.

2. Description of Related Art

Sports such as scuba diving tend to be equipment intensive, generally requiring a participant to bring a large quantity of equipment with them to the location of the activity. This is especially true in cold water diving conditions. One of the heaviest pieces of equipment is the scuba tank, which will generally weigh from 25–50 lbs.

There are a number of prior art patents for scuba tank holders. For example, U.S. Pat. No. Des. 319,003 illustrates a scuba tank holder which is placed between two scuba tanks. This locates two scuba tanks in a configuration similar to a set of "doubles", or "twin" tanks.

U.S. Pat. No. 4,832,398 describes a scuba tank holder and carrier in which the carrier is attached to the outside of a scuba tank. The carrier is formed of webbing, or other suitable flexible material and has one or more legs attached to the carrier to prevent the scuba tank from rolling.

U.S. Pat. No. 5,131,670 describes a scuba tank transportation device which employs a pair of wheels and a wire frame configured to accommodate the bottom of a scuba tank. The tank is inserted into the wire frame, and allows the tank to be rolled from one location to another by tilting the tank and wheeling it to a desired location.

Other scuba equipment can be transported to the desired location by carrying it, or by a variety of carts. Shopping carts, mover's dollies, and the like have been used by placing a gear bag, weight belt, or other equipment in the shopping cart or on the moving dolly and rolling them to the desired location. Interestingly, trash cans with wheels have also been employed to store and transport scuba diving equipment.

There are a number of prior art patents for such carts. For example, U.S. Pat. No. 5,040,808 describes a utility cart having a pair of wheels at one end, and which may be used to transport trash containers or other goods in a predetermined configuration.

A molded utility cart such as is described in U.S. Pat. No. 5,040,811 provides a four-wheel movable platform with several fixed handles to allow goods to be randomly placed in the cart and moved from location to location.

For larger applications, wheeled carts such as are described in U.S. Pat. No. 4,986,596 may be employed. This type of cart may find a variety of uses, including transporting baggage to an aircraft.

Although the prior art describes a number of useful scuba tank holders and pull-cart devices, none of the devices described above provide all the features and functions necessary for transporting scuba diving equipment. For example, prior art devices do not allow a scuba tank to be readily stored on the outside of an equipment storage bin. In addition, prior art devices do not provide an extendable handle which can be used to assist in transporting the equipment. Further, prior art devices do not include a locking mechanism to prevent undesired access to equipment which may be left on a beach during a dive. Finally, prior art devices cannot be sealed to maintain a desired atmospheric pressure during transportation by airplane or when subjected to a low pressure surrounding environment. Thus, there is a need in the art for an improved scuba tote for transporting scuba tanks.

SUMMARY OF THE INVENTION

To overcome the limitations in the prior art described above, and to overcome other limitations that will be apparent upon reading and understanding the present specification, the present invention discloses a scuba tote device specially adapted for transporting scuba tanks. The scuba tote has recessed cavities in its cover to accommodate scuba tanks. The recessed cavities include a shelf for maintaining the position of the scuba tank in the cover as the scuba tote is moved from one location to another. Straps are also employed to maintain the position of the scuba tanks within the recessed cavities during transportation. An airtight seal is employed to maintain atmospheric pressure within the body of the scuba tote. A locking mechanism restricts entry into the scuba tote. Wide wheels are used so that the scuba tote can readily traverse sand or other soft surfaces. A retractable handle is used to pull or push the scuba tote.

BRIEF DESCRIPTION OF THE DRAWINGS

Referring now to the drawings in which like reference numbers represent corresponding parts throughout:

FIGS. 3A and 3B illustrate the structure and operation of the locking tabs used with the handle;

FIG. 4 is a front view of the embodiment of FIG. 1;

DETAILED DESCRIPTION OF THE PREFERRED EMBODIMENT

Figure 1:
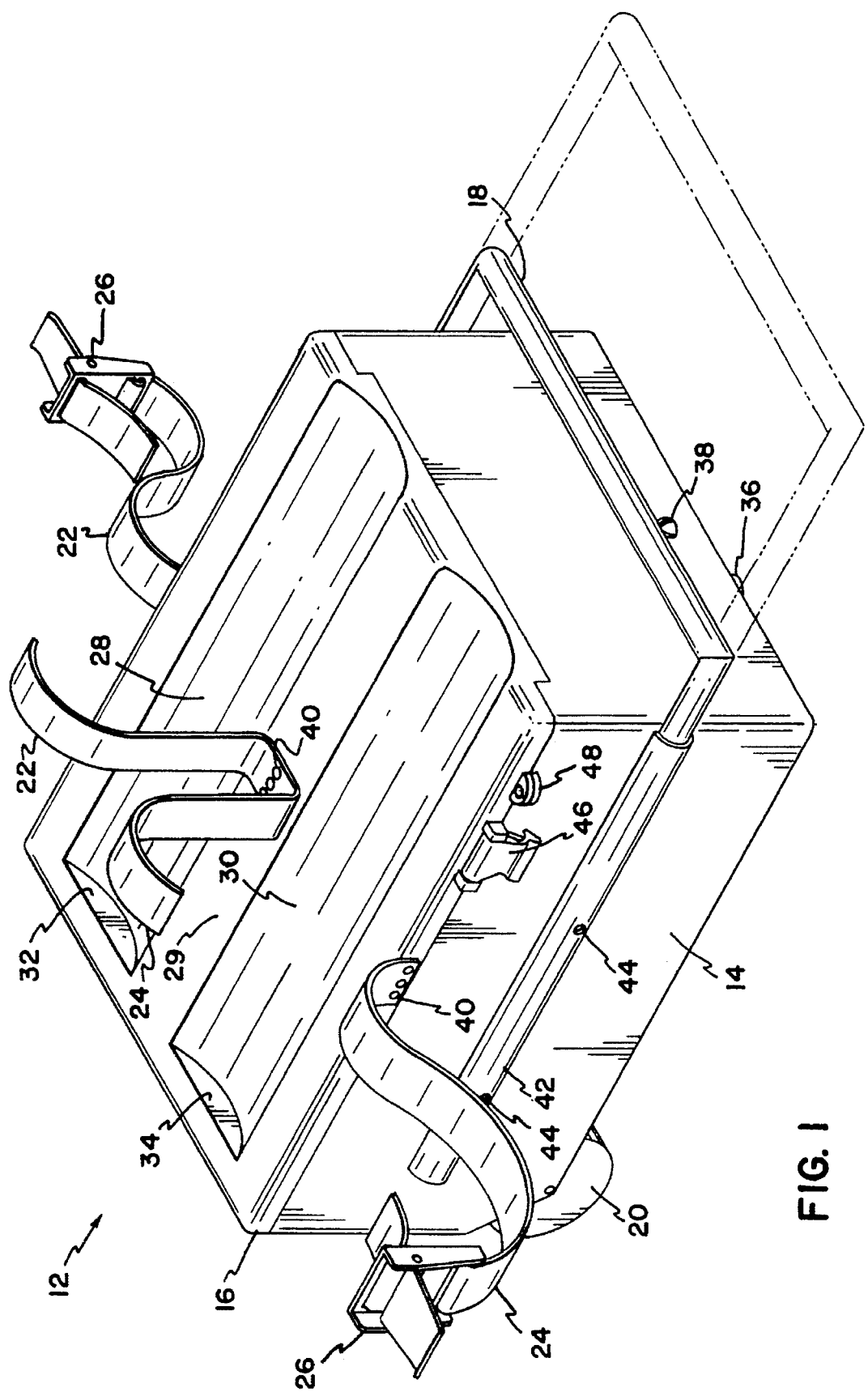
FIG. 1 is a top perspective view of an embodiment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

FIGS. 1, 2, 4, and 5 illustrate the general configuration of the scuba tote 12 of the present invention. The scuba tote 12 is formed primarily of a base 14 and a cover 16. A handle 18 is attached to one end of the base 14 and wheels 20 are provided so that the scuba tote 12 can be pulled or pushed. Straps 24 and 26, coupled by buckle 26, are used to secure scuba tanks lying in recessed cavities 28 and 30. The recessed cavities 28 and 30 have shelves 32 and 34 therein to prevent the scuba tanks from slipping off the cover 16 when the scuba tote 12 is tilted over the wheels 20. A leg stand 36 is provided for supporting the scuba tote when it is at rest. A pressure relief valve 38 is used to equalize atmospheric pressure inside and outside the scuba tote 12.

Base and Cover

The base 14 and cover 16 are preferably formed of a reinforced plastic material. The reinforcing material may comprise fiberglass, KEVLAR, or other suitable reinforcing materials. Alternatively, the plastic can be reinforced by employing thicker material, a honeycomb design, or strategically located ribs. A combination of fiber reinforcing with selectively located ribs and a honeycomb design may provide maximal strength while reducing the weight of the scuba tote 12. For similar reasons, base 14 is also preferably formed of a fiber reinforced plastic material.

The cover 16 supports and transports at least two scuba tanks, each located in one of the concave recesses 28 and 30 separated by ridge 29. In one embodiment, the concave recesses 28 and 30 are approximately 1⅜th of an inch deep and have a curvature that substantially conforms with the curvature of a standard aluminum 80 cubic foot scuba tank. Shelves 32 and 34 are formed at one end of the recesses 28 and 30, to prevent the scuba tanks from sliding off the cover 16 when one end of the scuba tote 12 is elevated.

The cover 16 must be sufficiently strong to support the weight of the scuba tanks. Each scuba tank may weigh approximately 30–35 lbs. for a single 80 cubic foot aluminum tank, although larger aluminum and steel scuba tanks may weigh 50 lbs. each. Additionally, it is anticipated that a third scuba tank may be placed on top of the two tanks in the recesses 28 and 30. Further, one or more weight belts may be placed inside the scuba tote 12, or may be placed on top of the scuba tanks, adding to the load applied to the top of cover 16. In some embodiments, it may be desirable to increase the weight carrying capacity of the cover 16 to allow the scuba tote 12 to be used as a seat for divers to sit on when putting on or taking off a wetsuit.

Straps

The straps 22 and 24 are used to secure the scuba tanks in the concave recesses 28 and 32. Buckle 26 is preferably a weight belt-type buckle to allow adjustment of the straps 22 and 24. The straps 22 and 24 are preferably affixed to the sides of cover 16 by rivets 40. In some configurations, it may be desirable to use a reinforcing plate opposite the rivets on the interior of the cover 16.

Straps 22 and 24 may be formed of 2-inch wide webbing such as is used to form weight belts and backpack straps. However, it is recognized that a variety of materials may be suitable for use as the straps 22 and 24, and buckle 26. For example, rubber straps may be employed and provide the advantage of allowing the straps 22 and 24 to be more securely fastened.

Handle

The handle 18 extends and retracts within the guides 42 located on both sides of the base 14. The handle 18 is preferably comprised of steel or aluminum tube having a diameter approximately 1½ inches. Each guide 42 is preferably a hollow tube of reinforced plastic and the handle 18 is free to slide in and out of the guides 42. Both the handle 18 and the guides 42 have a half-circle cross-section so that they conform the sides of the base 14.

Figure 2:
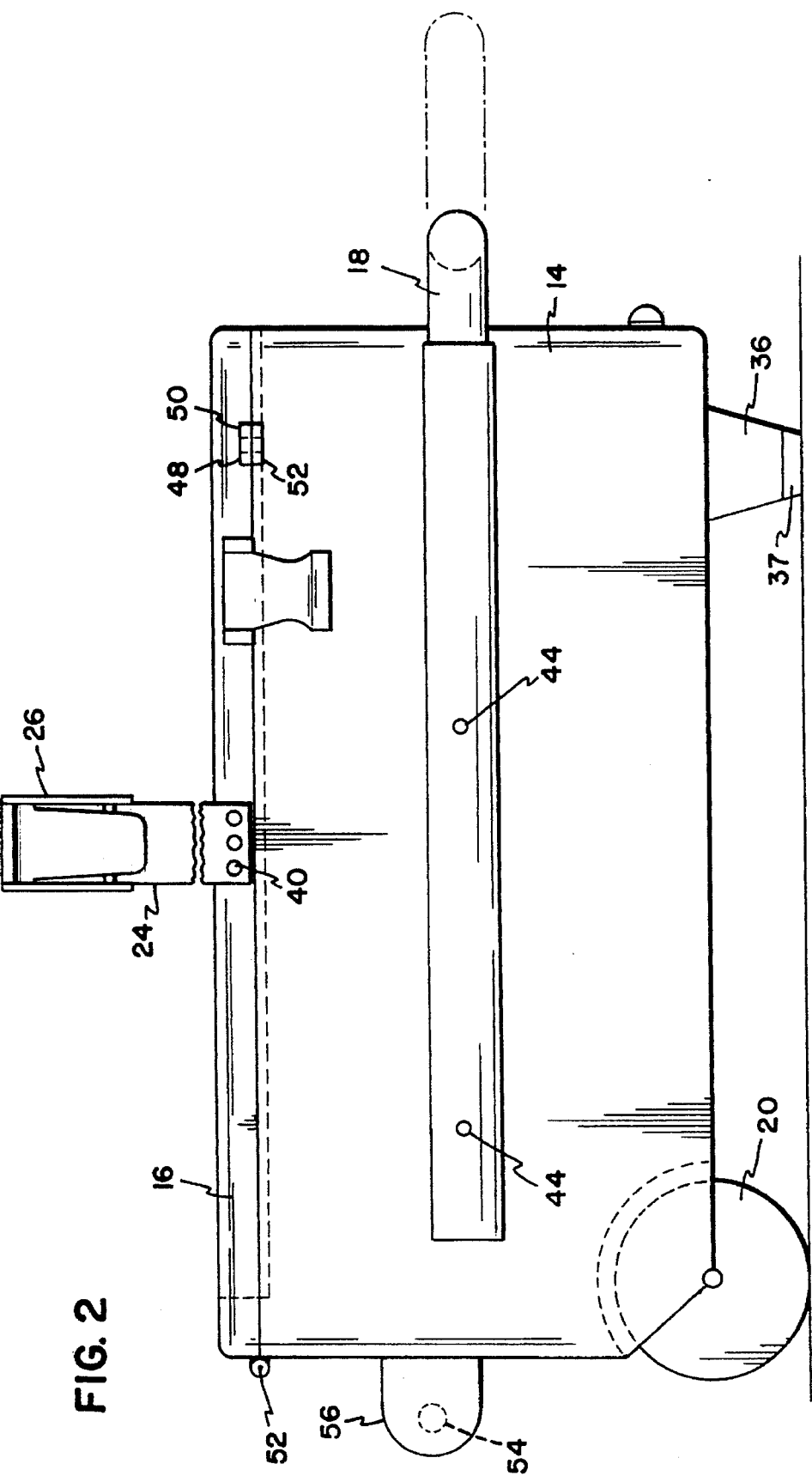
FIG. 2 is a side view of the embodiment of FIG. 1.

The handle 18 includes one or more locking tabs 44. FIGS. 3A and 3B further illustrate the operation of the locking tabs 44. Each locking tab 44 is loaded by a spring 48 to engage one or more apertures in the handle 18 and guide 42. A pin 50 extends slightly beyond the width of the apertures to prevent the locking tab 44 from falling out. In the preferred embodiment, there is a single extended position and a single retracted position as shown in FIGS. 1 and 2, wherein the dashed lines indicate the extend position. The locking tabs 44 may also provide a pivot point about which handle 18 will rotate when extended and lifted.

A handle 18 which is permanently attached to scuba tote 12 may be preferred over removable handles 18 which can become separated from the scuba tote 12 and lost or misplaced. Moreover, the handle 18, locking tabs 44, and guides 42 should have sufficient strength to allow a fully loaded scuba tote 12 to be tilted upwards and pulled or pushed to the desired location. The greatest stress will typically be applied when the scuba tote 12 is pulled or pushed through soft sand or mud, or along some other irregular surface. Premium models of the scuba tote 12 may be rugged enough, for example, to be lowered over the side of an embankment by attaching a rope to the handle 18, thereby allowing a diver to have easier access to an otherwise remote location.

Locking Mechanism

FIGS. 1 and 2 provide the best views of the locking mechanism 48 for the scuba tote 12. The base 14 and cover 16 of the scuba tote 12 can be locked by inserting a padlock through mechanism 48. The lock mechanism 48 comprises complementary flanges 50 and 52. Flange 50 is located on the cover 16 and flange 52 is located on the base 14. Both flanges 50 and 52 may be formed of reinforced plastic material, or may be formed of stainless steel or aluminum which extends slightly into cover 16 and base 14 to improve the security of the locking mechanism 48. The lock mechanism 48 may also be used in conjunction with a chain or cable type device to interconnect several scuba totes 12 or to anchor the scuba tote 12 to a permanent fixture to prevent theft.

Rear Handle

Figure 5:
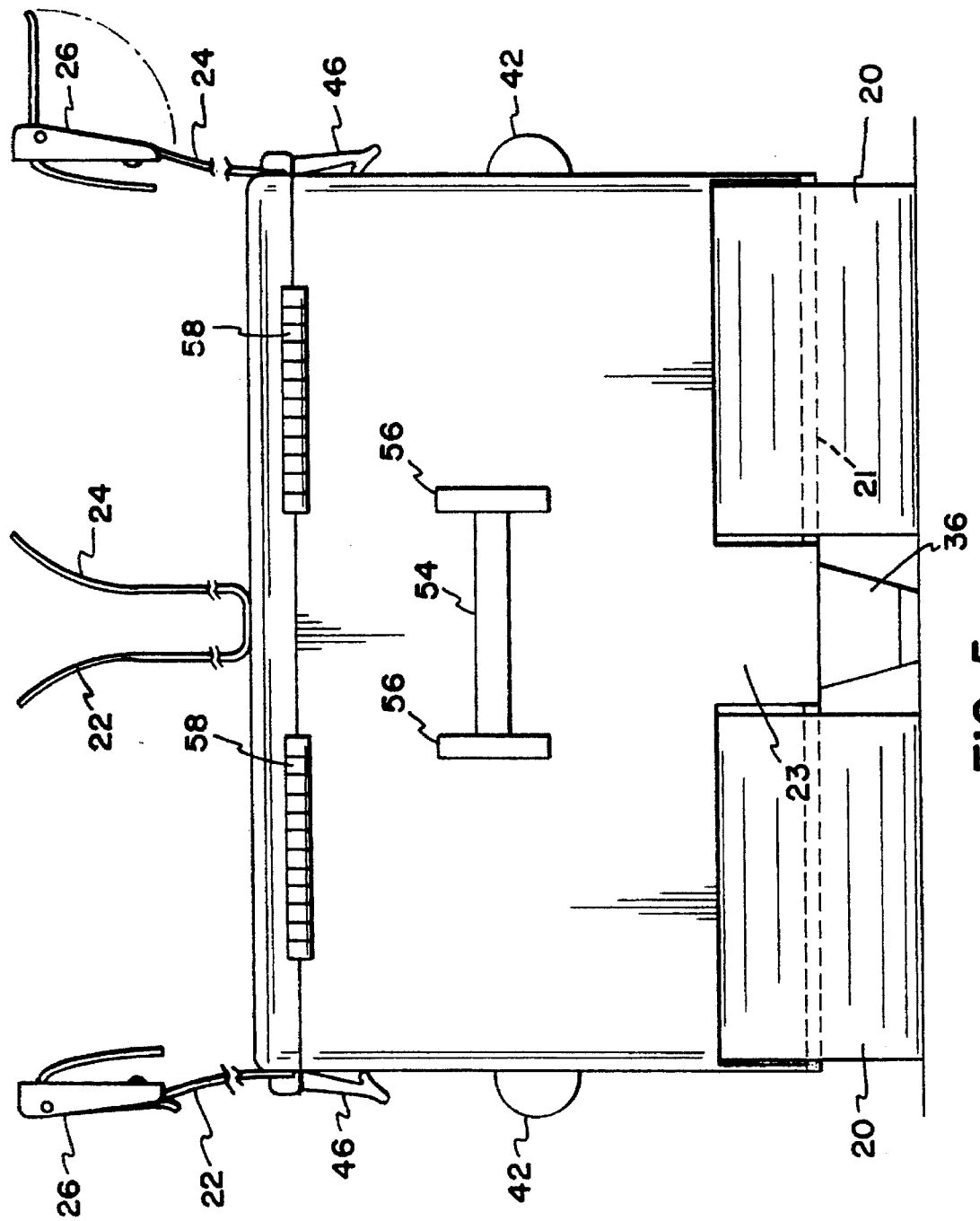
FIG. 5 is a back view of the embodiment of FIG. 1.

FIGS. 2 and 5 provide the best views of the rear handle 54 used with the scuba tote 12 of the present invention. The handle 54 is mounted on the back of the scuba tote 12 to assist in lifting the scuba tote 12, for example, into the back of truck. The handle 54 is connected to base 14 by brackets 56.

Hinges

FIGS. 2 and 5 provide the best views of the hinges 58 used to connect the cover 16 to the base 14. The hinges 58 are located along the back of base 14 and cover 16, and are formed integrally with cover 16 and body 14. A stainless steel pin (not shown) provides a pivot point for the hinges 58. However, it is recognized that alternative hinging mechanisms are available to those skilled in the art, including webbing material providing a flexible hinge, or some other hinge riveted or otherwise affixed to the inside or outside of base 14 and cover 16. A hinge 58 located on the outside of base 14 and cover 16 is preferred because this is the simplest hinge design which will allow cover 16 to be opened to the greatest degree of arc, and will allow the front of the top of cover 16 to rest on the ground when cover 16 is fully opened.

Latches

Figures 6A, 6B:
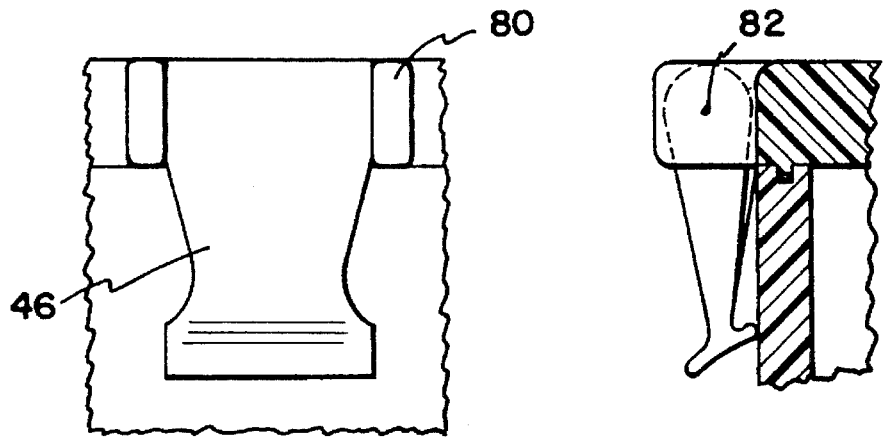
FIGS. 6A and 6B illustrate the structure and operation of the latches used with the base and cover.

FIGS. 6A and 6B provide perspective and cross-sectional views of the latch 46, respectively. The latches 46 are present on both sides of the scuba tote 12 to securely fasten the cover 16 to the base 14. When fastened together, the base 14 and cover 16 are airtight so as to maintain a desired atmospheric pressure.

Seal

Figure 7:
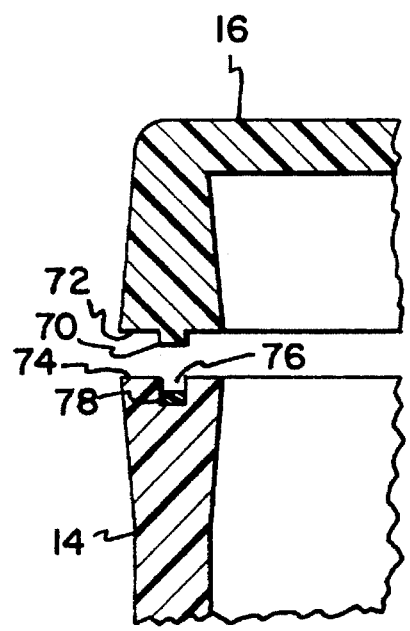
FIG. 7 is a cross-sectional view of the tongue and groove seal between the base and cover.

FIG. 7 is a cross-sectional side view illustrating the tongue 70, first lip 72, second lip 74 and groove 76 configuration of the seal between the base 14 and cover 16. A rubber gasket 78 may be located at the bottom of groove 76 to help form a watertight seal. In the preferred embodiment, the gasket 78 may be formed of a flat strip of Neoprene.

Both the base 14 and the cover 16 are slightly flared at this intersection. The flared section of cover 16 and base 14 are reinforced to insure that the weight placed on top of cover 16 can be readily transferred to the load bearing walls of base 14 without distorting either cover 16 or the base 14.

Pressure Relief Valve

Figure 8A:
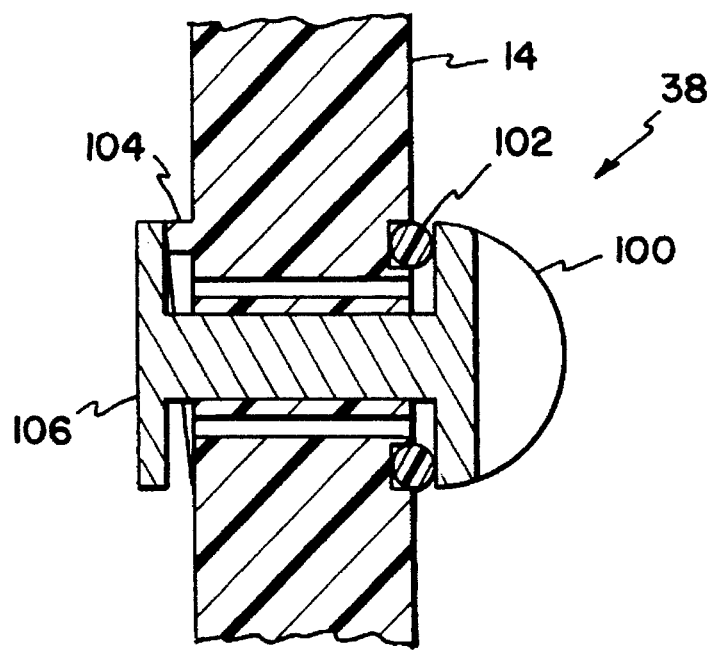
FIGS. 8A and 8B illustrate the structure and operation of the pressure relief valve in the base 14.
Figure 8B:
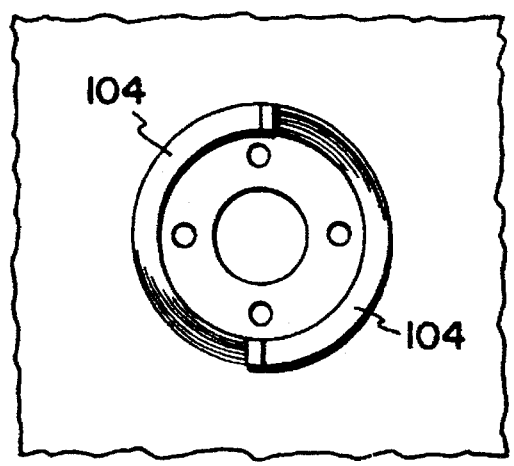

FIGS. 8A and 8B are a perspective and cross-sectional view of the pressure release valve 38. The pressure relief valve 38 provides a venting opening that may be located near the bottom of the scuba tote 12 to allow water or other liquids to drain, and to prevent over or under pressurization of the inside of the scuba tote 12 with respect to the surrounding atmosphere. It is highly recommended that the pressure relief valve 38 be located on the front of the scuba tote 12 to reduce the possibility of damage during movement. It is also recommended that before the scuba tote 12 is opened, the pressure relief valve 38 be used to equalize the pressure on the inside of the scuba tote 12 with the pressure on the outside of the scuba tote 12.

When operated, the sealing knob 100 is rotated to press O-ring 102 against the base 14, thereby preventing air from flowing through the valve 38. An angled backing support 104 and a mating backing 106 are connected to the knob 100 and cause the compression of the O-ring 102 when the knob 100 is rotated. The knob 100 may be rotated in an opposite direction to relieve the pressure on the O-ring 102, thereby allowing the pressure inside the scuba tote 12 to equalize with the pressure outside the scuba tote 12. To reduce the adverse affect of sand, dirt, and the like on the O-ring 102, it is preferred that the knob 100 remain in the tightened position, thereby ensuring that no sand, dirt, or the like will become lodged between the knob 100 and the O-ring 102 or between the O-ring 102 and the base 14.

Leg Stand

The leg stand 36 for the scuba tote 12 is attached to the underside of the base 14 of the scuba tote 12 near the front of body 14 at the opposite end from the wheels 20. The leg stand 36 in the preferred embodiment is a single post located about the center line of the base 14. Although only a single leg stand 36 is shown in the preferred embodiment, those skilled in the art will recognize that additional numbers of leg stands 36 or other means of support may be employed.

The leg stand 36 has a height of approximately half the diameter of wheels 20 so that the base 14 is level when scuba tote 12 is at rest on a level surface. The leg stand 36 is preferably formed of a reinforced plastic in a similar manner to body 14. A rubber foot 37 may be placed at the bottom of leg stand 36 to provide traction, thereby preventing the scuba tote 12 from rolling or sliding down an inclined surface. The rubber foot 37 will also tend to hold the scuba tote 12 in place as it is loaded or unloaded.

Wheels

The wheels 20 of the scuba tote 12 are extra wide in order to more readily distribute the weight placed on them, thereby allowing the scuba tote 12 to be easily wheeled through dirt and sand. The wheels 20 are preferably approximately 5 inches in diameter and 8 inches in width.

The wheels 20 may be formed of a smooth plastic or may be textured with a tread pattern. A rubber covering, or softer second layer of plastic may be located on the outer surface of wheels 20. This softer, or rubber covering will allow the scuba tote 12 to be wheeled more quietly on concrete or other hard surfaces. The rubber or softer plastic may also be textured with a tread pattern.

Axle

FIG. 5 is a rear view of the scuba tote 12 providing the best view of the placement of the axle 21 supporting the wheels 20. The axle 21 is inserted through and supported by rear section 23 of the base 14, as well as the outer panels of the base 14.

Conclusion

There has been described hereinabove an implementation of a novel scuba tote. Those skilled in the art may now make numerous uses of the present invention, including variations from the described embodiments without departing from the spirit of the invention which is defined solely by the scope of the following claims.

What is claimed is:

1. A scuba tote for storing and transporting scuba diving equipment, comprising:

(a) a base comprising a floor and front, back, first and second sides forming a container for the scuba diving equipment;

(b) one or more wheels located on the bottom of the base;

(c) a handle connected to the base for pulling the scuba tote;

(d) a cover attached to the base, the cover including concave recesses in an outer configuration of the cover, each recess having a curvature substantially conforming to the curvature of a scuba tank for storing and transporting scuba tanks therein; and (e) one or more straps, extending across the concave recesses in a direction substantially perpendicular thereto, for engaging upper surfaces of the scuba tanks to secure the scuba tanks in the concave recesses, wherein the straps are affixed to the cover on opposite sides thereof and between the concave recesses.

2. The scuba tote as set forth in claim 1 above, wherein the concave recesses are separated by a distance at least sufficient to allow two scuba diving tanks to be placed on the cover with each scuba diving tank substantially resting against the concave surface.

3. The scuba tote as set forth in claim 1 above, further comprising a ridge formed in the outer configuration of the cover substantially separating and parallel to the concave recesses.

4. The scuba tote as set forth in claim 1 above, further comprising one or more latches connected to the cover and the base to allow securing of the cover to the base.

5. The scuba tote as set forth in claim 1 above, further comprising a locking means for locking the cover to the base.

6. The scuba tote as set forth in claim 1 above, further comprising a hinge coupling the cover to the base.

7. The scuba tote as set forth in claim 6 above, wherein the cover and base both comprise means for forming an airtight seal for the interior of the scuba tote.

8. The scuba tote as set forth in claim 7 above, further comprising a pressure relief valve connected to the base.

9. The scuba tote as set forth in claim 1 above, further comprising a stand connected to the base and located opposite the wheels for resting the scuba tote thereon and having a height suitable for maintaining the base in a substantially level configuration.

10. The scuba tote as set forth in claim 1 above, wherein the handle is retractable and slidably connected to the first and second sides of the base.

11. The scuba tote as set forth in claim 1 above, wherein the handle is formed of a metal tube extending from the first side to the second side of the base.

12. The scuba tote as set forth in claim 1 above, wherein the wheels have a width suitable to allow the scuba tote to be pulled along a sandy beach when fully loaded and not become submerged in the sand.

13. An apparatus for transporting scuba tanks, comprising:

(a) a cart for transporting items stored therein, the cart comprising a base, a plurality of wheels attached to the base, and a handle connected to the base for pulling the cart;

(b) a lid attached to the cart, the lid including outer surface recesses, each of the outer surface recesses substantially conforming to a scuba tank's shape for supporting the scuba tank; and (c) one or more straps, extending across the concave recesses in a direction substantially perpendicular thereto, for engaging upper surfaces of the scuba tanks to secure the scuba tanks in the concave recesses, wherein the straps are affixed to the lid on opposite sides thereof and between the concave recesses.

14. The apparatus as set forth in claim 13 above, further comprising means for coupling the lid to the cart.

15. The apparatus as set forth in claim 14 above, wherein the lid and the cart both comprise means for forming an airtight seal.

16. The apparatus as set forth in claim 15 above, further comprising a pressure relief valve connected to the base.

17. The apparatus as set forth in claim 13 above further comprising a stand connected to the base for resting the cart thereon.

18. A cart for carrying scuba tanks, comprising:

(a) a wheeled cart;

(b) a handle connected to the wheeled cart for pulling and pushing the wheeled cart;

(c) a cover attached to the wheeled cart comprising recesses each having a curvature that substantially conforms to the curvature of a scuba tank for storing and transporting the scuba tank therein; and (d) one or more straps, extending across the concave recesses in a direction substantially perpendicular thereto, for engaging upper surfaces of the scuba tanks to secure the scuba tanks in the concave recesses, wherein the straps are affixed to the cover on opposite sides thereof and between the concave recesses.

* * * * *